United States Patent [19]

Fukuhara et al.

[11] 4,151,374
[45] Apr. 24, 1979

[54] BUS CONNECTION DETECTOR CIRCUIT FOR BUS CONNECTION MATRIX CIRCUIT

[75] Inventors: Takeshi Fukuhara, Fujisawa; Yuji Miura, Yokohama, both of Japan

[73] Assignee: Hitachi, Ltd., Japan

[21] Appl. No.: 794,706

[22] Filed: May 9, 1977

[30] Foreign Application Priority Data

May 10, 1976 [JP] Japan ................................. 51-52207

[51] Int. Cl.² .............................................. H04Q 3/52
[52] U.S. Cl. ............................ 179/18 GF; 340/166 R
[58] Field of Search ........... 179/18 F, 18 FA, 18 GE, 179/18 GF; 340/166 R, 166 EL, 324 M, 176

[56] References Cited

U.S. PATENT DOCUMENTS

| | | | |
|---|---|---|---|
| 3,054,985 | 9/1962 | Mason | 340/176 |
| 3,390,236 | 6/1968 | Lawrence | 179/18 GE |
| 3,801,958 | 4/1974 | Simmons et al. | 340/176 |

FOREIGN PATENT DOCUMENTS

967256  8/1964  United Kingdom .................. 179/18 F

Primary Examiner—Thomas A. Robinson
Attorney, Agent, or Firm—Craig & Antonelli

[57] ABSTRACT

A bus connection detector circuit used for a switching network comprising a plurality of semiconductor switch elements of PNPN semiconductor four-layered structure, which are arranged in a matrix array and adapted to conduct upon the application of a potential thereacross. A plurality of diodes are connected at their one end to horizontal and vertical buses, respectively, and connected at their other end in common to one end of a voltage regulating diode for detection of the potential of the buses, and the other end of the voltage regulating diode is connected to a voltage level sensor, thus making up a single bus connection detector circuit, so that the connection of each bus can be detected by the single bus connection detector circuit.

4 Claims, 5 Drawing Figures

BUS CONNECTION DETECTOR CIRCUIT FOR BUS CONNECTION MATRIX CIRCUIT

This invention relates to a bus connection detector circuit for horizontal or vertical buses of a switching network used with a telephone exchange system or the like.

FIG. 1 shows an example of the switching network for which a bus connection detector circuit according to the present invention is applied. In this drawing, reference numerals 101 to 123 show PNPN diodes which conduct upon the application of a potential VF thereacross, numerals 201 to 203 show horizontal buses, 301 to 303 vertical buses, numerals 401 to 403 horizontal switch circuits for supplying an output voltage of +VF/2, and numerals 501 to 503 vertical switch circuits for supplying an output voltage of −VF/2. The operation of the circuit of FIG. 1 will be described below with reference to the potential distribution shown above, although the invention is not limited to it. In order to turn on the PNPN diode 101 in this switching network, both the horizontal switch circuit 401 and the vertical switch circuit 501 are turned on, so that the potentials of +VF/2 and −VF/2 are applied respectively to the horizontal and vertical buses 201 and 301. The potential of VF is applied across the PNPN diode 101 thereby to make the PNPN diode 101 conductive. Once the PNPN diode conducts, its resistance is reduced, and therefore if the internal resistances of the switch circuits are made equal for both the horizontal and vertical buses 201 and 301, the potentials thereof are substantially 0V. Thus, by monitoring the potential of the horizontal and vertical buses, it is possible to detect the conductive state or connection of the PNPN diodes. For this purpose, the conventional circuits include bus connection detector circuits for both horizontal and vertical buses respectively for detecting bus connection thereof. With the increase in the size of the matrix of the switch circuit, however, the number of the detector circuits also increases proportionately and uneconomically.

An object of the present invention is to provide a bus connection detector circuit capable of detecting the bus connection of a plurality of horizontal or vertical buses.

According to the present invention, there is provided a bus connection detector circuit used for a switching network comprising a plurality of semiconductor switch elements with a PNPN semiconductor four-layered structure which are arranged in a matrix array and adapted to be turned on upon the application of a voltage thereacross. The bus connection detector circuit comprises a plurality of diodes each being correspondingly connected at their one end to each of the plurality of horizontal and vertical buses and connected at their other end in common to a voltage regulating diode for detecting the bus connection. A voltage level sensor is connected to the other end of the voltage regulating diode.

Figure 2:
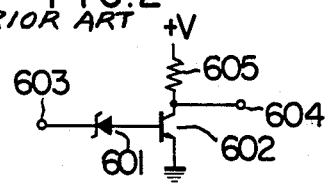
FIG. 2 is a diagram showing an example of a prior art switching circuit usable in the present invention as a bus connection detector circuit for horizontal buses of the circuit of FIG. 1.
Figure 3:
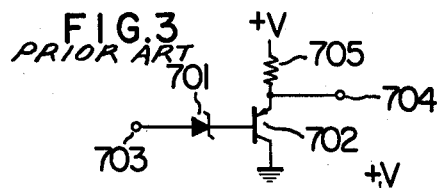
FIG. 3 is a diagram showing another example of a prior art switching circuit usable in the present invention as a bus connection detector circuit for vertical buses of the circuit of FIG. 1.

In the first place, the inventors basic conception of the constitution of a bus connection detector circuit will be described. FIGS. 2 and 3 show examples of bus connection detector circuits which are well known per se though usable in the present invention. The circuit of FIG. 2 is adapted to be connected to each of the horizontal buses 201 to 203 in the switching network of FIG. 1, while the circuit of FIG. 3 is adapted to be connected to each of the vertical buses 301 to 303 of the switching network of FIG. 1. The input terminal 603 in FIG. 2 is connected to each of the horizontal buses. When no potential is present in the bus, the voltage regulating diode 601 is cut off, so that the transistor 602 is also turned off, maintaining the output terminal 604 at +V potential. When a potential is applied to the horizontal bus, both the voltage regulating diode 601 and the transistor 602 conduct, thereby maintaining the output terminal 604 at the ground potential. In the drawings, numeral 605 designates a resistor.

The input terminal 703 in the circuit of FIG. 3 is connected to the vertical buses. When no potential is present at the buses, the voltage regulating diode 701 is cut off and therefore the transistor 702 is in a cut-off state, thereby maintaining the output terminal 704 at +V potential. When a potential is applied to the vertical buses, both the voltage regulating diode 701 and the transistor 702 conduct, so that the output terminal 704 is kept at the ground potential. By the way, reference numeral 705 in the drawing designates a resistor.

Since the inventors of the present invention had conceived before the present invention that the circuits of FIGS. 2 and 3 might be connected to each of the horizontal buses and each of the vertical buses, respectively, in order to detect the potential of buses for the purpose of detecting erroneous operation of the switching elements, then, an increase in the size of the matrix of the switching network proportionately increases the number of the detector circuits very uneconomically.

Figure 1:
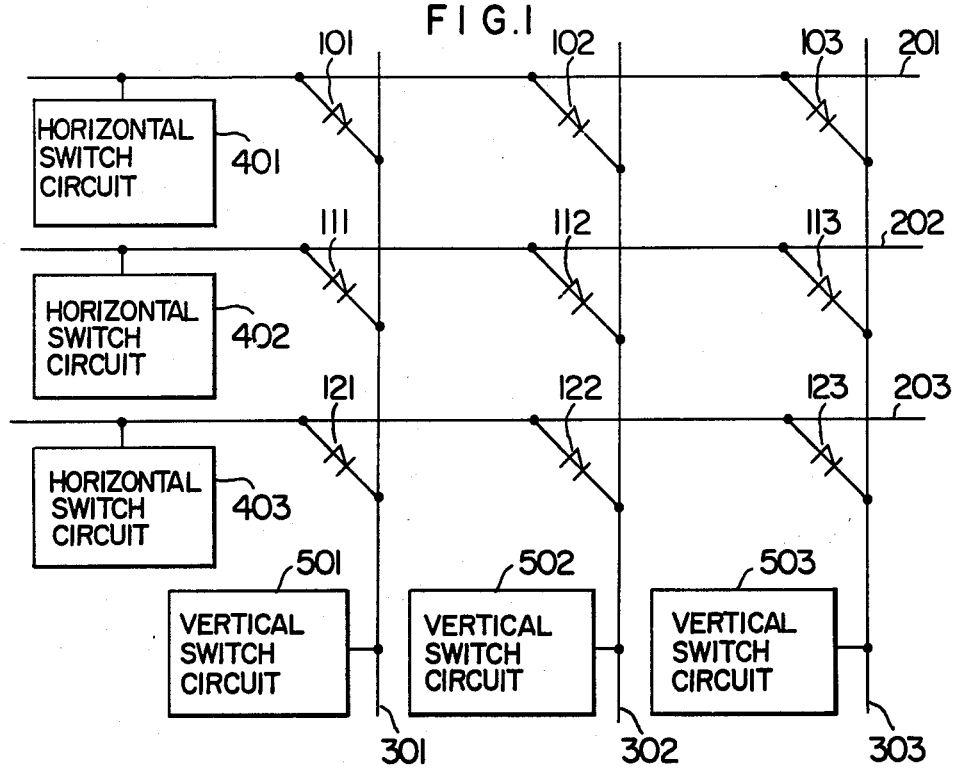
FIG. 1 is a diagram showing an example of the switching network to which the bus connection detector circuit according to the present invention is applicable.

In the matrix system of FIG. 1, only one of the horizontal or vertical buses is operated at a time. Therefore, even when a terminal for displaying the detection results is not provided for each bus, it is possible to detect the establishment of a connection by confirming the potential of each bus after each connection.

In consideration of the above fact, the circuit according to the present invention is characterized by employing a single detection circuit for detection of operations of the plurality of switching elements, and this single detection circuit is connected through diodes to the respective buses of either groups of horizontal or vertical buses in such a manner that any variations in the potential of the buses fail to affect the buses already connected.

Figure 4:
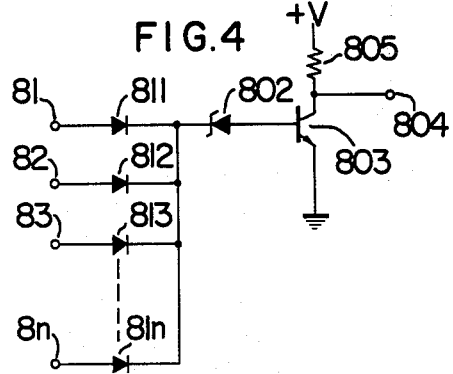
FIG. 4 shows an embodiment of the bus connection detector circuit for the horizontal buses according to the present invention.

An embodiment of the bus connection detector circuit according to the present invention is shown in FIG. 4. In this drawing, reference numerals 811 to 81n designate diodes, numeral 802 a voltage regulating diode, numeral 803 a transistor, and numeral 805 a resistor.

The ends of the diodes 811 to 81n are used as input terminals 81 to 8n, which are connected to the horizontal buses in FIG. 1, respectively. The other ends of the diodes 811 to 81n are connected in common to an end of the voltage regulating diode 802, while the other end of the voltage regulating diode 802 is connected to the base of the transistor 803.

The operation of the bus connection detector circuit according to the present invention will be explained with reference to FIG. 4. When no potential is present in any of the buses, the voltage regulating diode 802 is cut off as in the conventional circuits, with the result that the transistor 803 is also in a cut-off state, thereby maintaining the output terminal 804 at $+V$ potential. When one of the horizontal buses, for example, the input terminal 81 assumes the potential of $+VF/2$, the diode 811 connected to that bus conducts. As a result, the voltage regulating diode 802 and the transistor 803 conduct, so that the output terminal 804 is kept at ground potential. Under this condition, the potential of the junction point of the diode 811 and the voltage regulating diode 802 rises to a value of $+VF/2$ less the forward voltage drop of the diode 811. Since the buses connected to the other input terminals of the detector circuit are at substantially 0V as described above, however, the diodes connected to such buses are cut off and therefore are not affected by the potential variations of the bus in operation.

Figure 5:
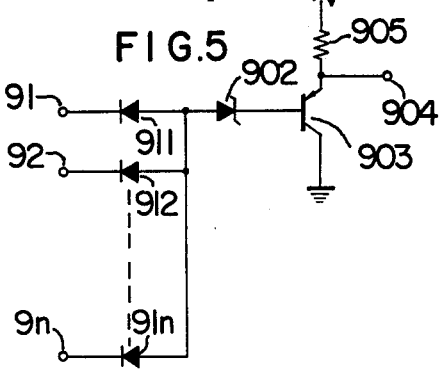
FIG. 5 is a diagram showing an embodiment of the bus connection detector circuit for the vertical buses according to the present invention.

Another embodiment of the bus connection detector circuit according to the present invention is shown in FIG. 5. In the drawing, reference numerals 911 to 91n designate diodes, numeral 902 a voltage regulating diode, numeral 903 a transistor, numeral 905 a resistor. The input terminals 91 to 9n are connected to the vertical buses in the circuit of FIG. 1, respectively. When one of the vertical buses assumes the voltage of $-VF/2$, the diode connected to that bus (one of the diodes 911 to 91n) conducts, followed by the conduction of the voltage regulating diode 902 and the transistor 903. In this case, too, the operation of the diode has no effect on the potential of the other vertical buses.

It will be understood from the foregoing description that, by use of the bus connection detector circuit according to the present invention, it is possible to detect the connection of each bus by a single bus connection detector circuit very economically without providing a bus connection detector circuit for each bus.

What is claimed is:

1. In a bus connection matrix circuit comprising:
   a plurality of horizontal and vertical buses arranged in a matrix array;
   a plurality of switching elements each connected at a different one of the crosspoints of said matrix array between one of said horizontal buses and one of said vertical buses, each of said switching elements having a PNPN semiconductor four-layered structure and two major electrodes between which a conductive path is selectively formed in response to the application of a control voltage of a predetermined level thereacross, said switching elements being turned on when said control voltage is supplied thereacross; and
   means for supplying said control voltage between selected ones of said horizontal buses and selected one of said vertical buses,
   the improvement comprising a bus connection detector circuit connected to at least one of the two bus groups comprised of said horizontal buses and said vertical buses including:
   a plurality of first diodes connected in common to one another at one end with the same polarity thereof, each of said first diodes being connected at the other end thereof to a different one of the buses of the one of said two bus groups;
   a zener diode connected at one end thereof to said common end of said first diodes, said zener diode having a breakdown voltage corresponding to the control voltage for the switching elements to detect when said control voltage appears on one of said buses so that said zener diode and the one of said first diodes connected to the one of said buses may conduct when said control voltage appears; and
   voltage level sensing means connected to the other end of the said zener diode for providing an output in response to the conduction of said zener diode.

2. A bus connection detector circuit according to claim 1, wherein said voltage level sensing means includes an NPN transistor and a resistor, a collector of said transistor being supplied through said resistor with a positive potential, a base of said transistor being connected to the other end of said zener diode, an emitter of said transistor being grounded, and said output being derived from the collector terminal of said transistor.

3. A bus connection detector circuit according to claim 1, wherein said voltage level sensing means includes a PNP transistor and a resistor, an emitter of said transistor being supplied through said resistor with a positive potential, a base of said transistor being connected to the other end of said zener diode, a collector of said transistor being grounded, and said output being derived from the emitter terminal of said transistor.

4. A bus connection detector circuit according to claim 1, wherein said voltage level sensing means comprises a transistor which is rendered conductive in response to the conduction of said zener diode.

* * * * *